United States Patent
Bensberg et al.

(10) Patent No.: US 10,713,284 B2
(45) Date of Patent: Jul. 14, 2020

(54) PLATFORM-BASED DATA SEGREGATION

(71) Applicant: SAP SE, Walldorf (DE)

(72) Inventors: Christian Bensberg, Heidelberg (DE);
Stefan Baeuerle, Rauenberg (DE);
Frank Renkes, Rauenberg (DE);
Torsten Strahl, Kleinmachnow (DE);
Alexander Boehm, Sandhausen (DE)

(73) Assignee: SAP SE, Walldorf (DE)

( * ) Notice: Subject to any disclaimer, the term of this patent is extended or adjusted under 35 U.S.C. 154(b) by 267 days.

(21) Appl. No.: 15/202,848

(22) Filed: Jul. 6, 2016

(65) Prior Publication Data

US 2018/0011875 A1 Jan. 11, 2018

(51) Int. Cl.
| | | |
|---|---|---|
| G06F 16/29 | (2019.01) | |
| G06F 16/22 | (2019.01) | |
| G06F 11/14 | (2006.01) | |
| G06F 16/27 | (2019.01) | |

(52) U.S. Cl.
CPC .......... *G06F 16/29* (2019.01); *G06F 11/1448* (2013.01); *G06F 11/1451* (2013.01); *G06F 16/2282* (2019.01); *G06F 16/278* (2019.01)

(58) Field of Classification Search
CPC ...................................................... G06F 16/29
See application file for complete search history.

(56) References Cited

U.S. PATENT DOCUMENTS

| | | | |
|---|---|---|---|
| 7,774,329 B1* | 8/2010 | Peddy | G06Q 30/02 707/705 |
| 2014/0149460 A1* | 5/2014 | Thuringer | G06F 16/217 707/781 |
| 2015/0088505 A1 | 3/2015 | Kurzweil et al. | |

FOREIGN PATENT DOCUMENTS

| | | |
|---|---|---|
| JP | 200538470 A | 12/2005 |
| JP | 2012164090 A | 8/2012 |
| WO | 2004025470 A1 | 3/2004 |

OTHER PUBLICATIONS

European Search Report for EP Application No. 17001142.3 dated Dec. 15, 2017, 8 pp.

* cited by examiner

*Primary Examiner* — Van H Oberly
(74) *Attorney, Agent, or Firm* — Buckley, Maschoff & Talwalkar LLC (57) ABSTRACT

A system includes reception of a first query at a first host, determination, at the first host, that the first query is associated with a first table, the first table including geographically-restricted data and a partitioning column storing identifiers of geographic restrictions, determination, at the first host and based on the partitioning column of the first table and on the first query, a first partition of the first table and a storage location of the first partition, and execution of the first query at the first host in conjunction with the storage location of the first partition.

20 Claims, 10 Drawing Sheets

PLATFORM-BASED DATA SEGREGATION

BACKGROUND

Enterprise database systems receive, generate, and store data related to many aspects of a business enterprise. This data may relate to sales, customer relationships, marketing, supplier relationships, inventory, human resources, and/or finances. For performance and reliability reasons, enterprise database systems are becoming increasingly distributed, such that database nodes (and, consequently, the data stored therein) may be located in any number of distinct geographical locations.

Country-specific data privacy regulations may require that certain types of data (e.g., personal data) be stored in specific geographical locations. Typically these requirements are complied with at the database application level, with limited or no support from the underlying database platform.

DETAILED DESCRIPTION

The following description is provided to enable any person in the art to make and use the described embodiments. Various modifications, however, will remain readily apparent to those in the art.

Briefly, some embodiments advantageously and inventively leverage non-primary key-based range partitioning in order to store portions of table data in desired geographic locations and retrieve the data therefrom. Embodiments may also include replication of selected tabular data in order to provide performance benefits.

Figure 1:
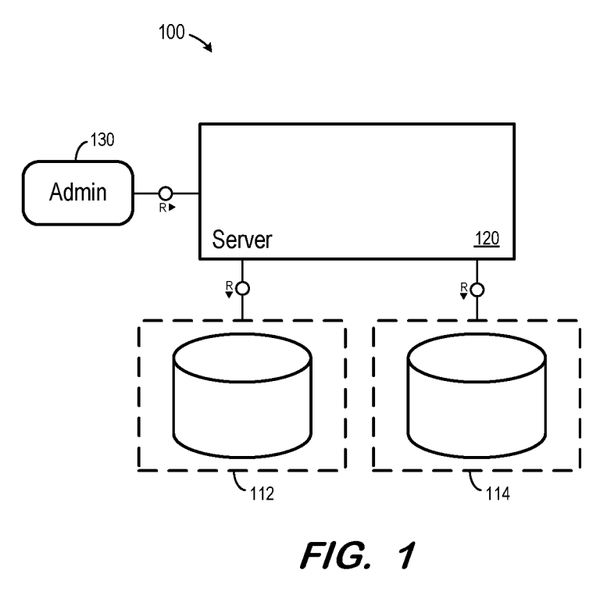
FIG. 1 is a block diagram of a system architecture according to some embodiments.

FIG. 1 is a block diagram of design-time architecture 100 according to some embodiments. Architecture 100 includes data stores 112 and 114, server 120, and administrator 130. Embodiments are not limited to architecture 100.

Server 120 may comprise any system for serving queries of data stores 112 and 114. Data stores 112 and 114 may each comprise any type of query-responsive data store. Data stores 112 and 114 may be located in different geographic locations, such as in different legal jurisdictions (e.g., Germany and the U.S.A.). It may be desired, due to privacy and/or other legal or business considerations, to store certain data of a particular data table (e.g., an Employee table) in data store 112 and other data of the particular data table in data store 114. For example, it may be desired to store rows of an Employee table which relate to German employees in data store 112, and to store rows of the Employee table which relate to U.S. employees in data store 114.

Administrator 130 may comprise any computing system which interacts with server 120 to provide administrative functions thereto. Such functions may include configuration settings, maintenance, and backup/recovery. Administrator 130 may also allow a user, via a user interface, to define table structures and other metadata describing data stored in data stores 112 and 114. This metadata may be stored in a metadata repository of server 120.

Figure 2:
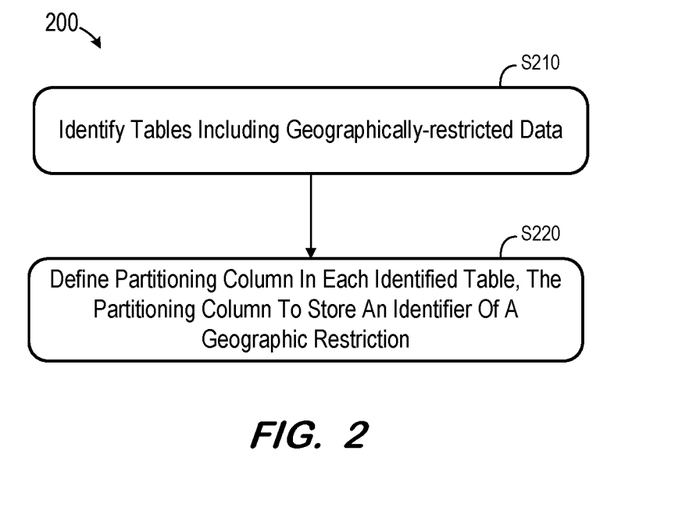
FIG. 2 comprises a flow diagram of a process according to some embodiments.

FIG. 2 comprises a flow diagram of process 200 according to some embodiments. In some embodiments, various hardware elements of system 100 execute program code to perform process 200. Process 200 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, database tables including geographically-restricted data are identified. In one example of S210, a user may operate administrator 130 to access a database catalog of server 120. The database catalog may include metadata defining a logical layer of database tables and relationships therebetween. Each database table is defined to include one or more columns. For example, the aforementioned Employee table may be defined in the database catalog to include columns Employee ID, Employee Name, Employee Address, Employee Contact Telephone, Employee Salary, etc.

Next, at S220, a partitioning column is defined for each table identified at S210. The partitioning column is to store an identifier of a geographic restriction. Continuing the above example, the user interface application executed on administrator 130 to view the database catalog may also provide a function to edit the database catalog. A user may utilize this function at S220 to define a partitioning column Storage Location. Such a column may be intended to store identifiers of geographic locations in which the data of associated table rows should be stored.

Process 200 may be executed during design time and during any time in which geographically-sensitive database tables are added to architecture 100. Data stores 112 and 114 are not limited to storing geographically-sensitive data, and architecture 100 may comprise data stores which do not store geographically-sensitive data and may therefore be located in any suitable location.

According to some embodiments, process 200 is not necessary to be conducted by an administrator, as an application developer pre-defines the tables of interest to include a partitioning column. Accordingly, the application sets proper domain values (e.g. country codes) in that column and also ensures that these values are always used in WHERE clauses (i.e., in predicates) to ensure that the database can efficiently prune partitions, if applicable.

Figure 3:
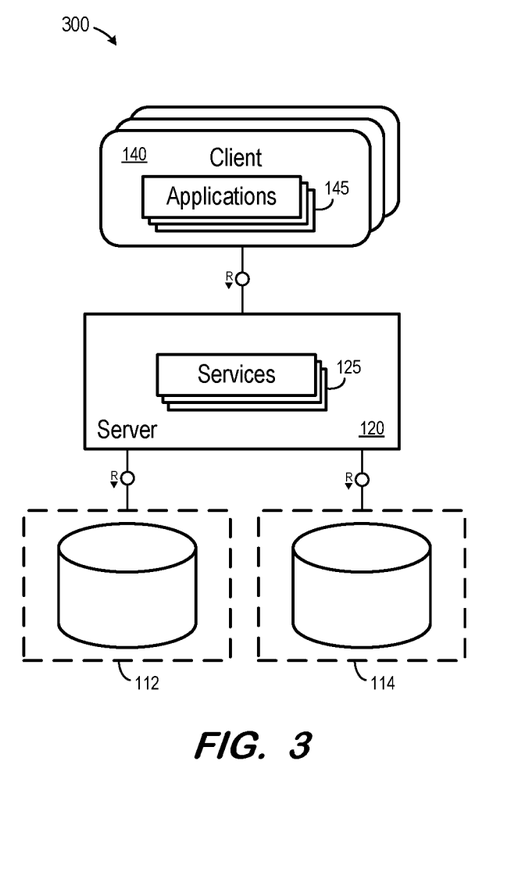
FIG. 3 is a block diagram of a design-time system architecture according to some embodiments.

FIG. 3 illustrates runtime architecture 300 according to some embodiments. Architecture 300 includes server 120 and data stores 112 and 114 of FIG. 1, and also includes clients 140 and applications 145 executing thereon. Generally, server 120 may execute and provide services 125 to applications 145. More specifically, services 125 executing within server 120 receive requests from applications 145 executing on clients 140 and provide results to applications 145 based on data stored within data stores 112 and 114.

Services 125 may comprise server-side executable program code (e.g., compiled code, scripts, etc.) which provide functionality to applications 145 by providing user interfaces to clients 140, receiving requests from applications 145, retrieving data from data stores 112 and 114 based on the requests, processing the data received from data stores 112 and 114, and providing the processed data to applications 145.

In one specific example, a client 140 executes an application 145 to present a user interface to a user on a display of the client 140. The user enters a query into the user interface consisting of one or more dimensions and/or one or more measures. The query may also include other information such as filters. The application passes a request based on the query to one of services 125. A Structured Query Language (SQL) statement is generated based on the request and forwarded to appropriate ones of data stores 112 and 114, a result set is returned, and the application 145 creates a report/visualization based on the result set.

Server 120 provides any suitable protocol interfaces through which applications 145 executing on clients 140 may communicate with services 125. For example, server 120 may include a HyperText Transfer Protocol (HTTP) interface supporting a transient request/response protocol over Transmission Control Protocol (TCP), and/or a WebSocket interface supporting non-transient full-duplex communications between server 120 and any clients 140 which implement the WebSocket protocol over a single TCP connection.

One or more services 125 executing on server 120 may communicate with data stores 112 and 114 using database management interfaces such as, but not limited to, Open Database Connectivity (ODBC) and Java Database Connectivity (JDBC) interfaces. These types of services 125 may use SQL to manage and query data stored in data stores 112 and 114.

The data of data stores 112 and 114 may be distributed among several relational databases, dimensional databases, and/or other data sources. Embodiments are not limited to any number or types of data stores. In some embodiments, the data of data stores 112 and 114 may comprise one or more of conventional tabular data, row-based data, column-based data, and object-based data. Either of data stores 112 and 114 may implement an "in-memory" database, in which a full database stored in volatile (e.g., non-disk-based) memory (e.g., Random Access Memory). The full database may be persisted in and/or backed up to fixed disks (not shown). Alternatively, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with server 120. The user interfaces of applications 145 may comprise user interfaces suited for reporting, data analysis, and/or any other functions based on the data of data stores 112 and 114.

Presentation of a user interface as described herein may comprise any degree or type of rendering, depending on the type of user interface code generated by server 120. For example, a client 140 may execute a Web Browser to request and receive a Web page (e.g., in HTML format) from server 120 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine. In another method, one of more of clients 140 execute applications 145 loaded from server 120, that receive data and metadata by requests to services 125 executed on the server 120. Data and metadata is processed by the applications 145 to render the user interface on the client 140.

Figure 4:
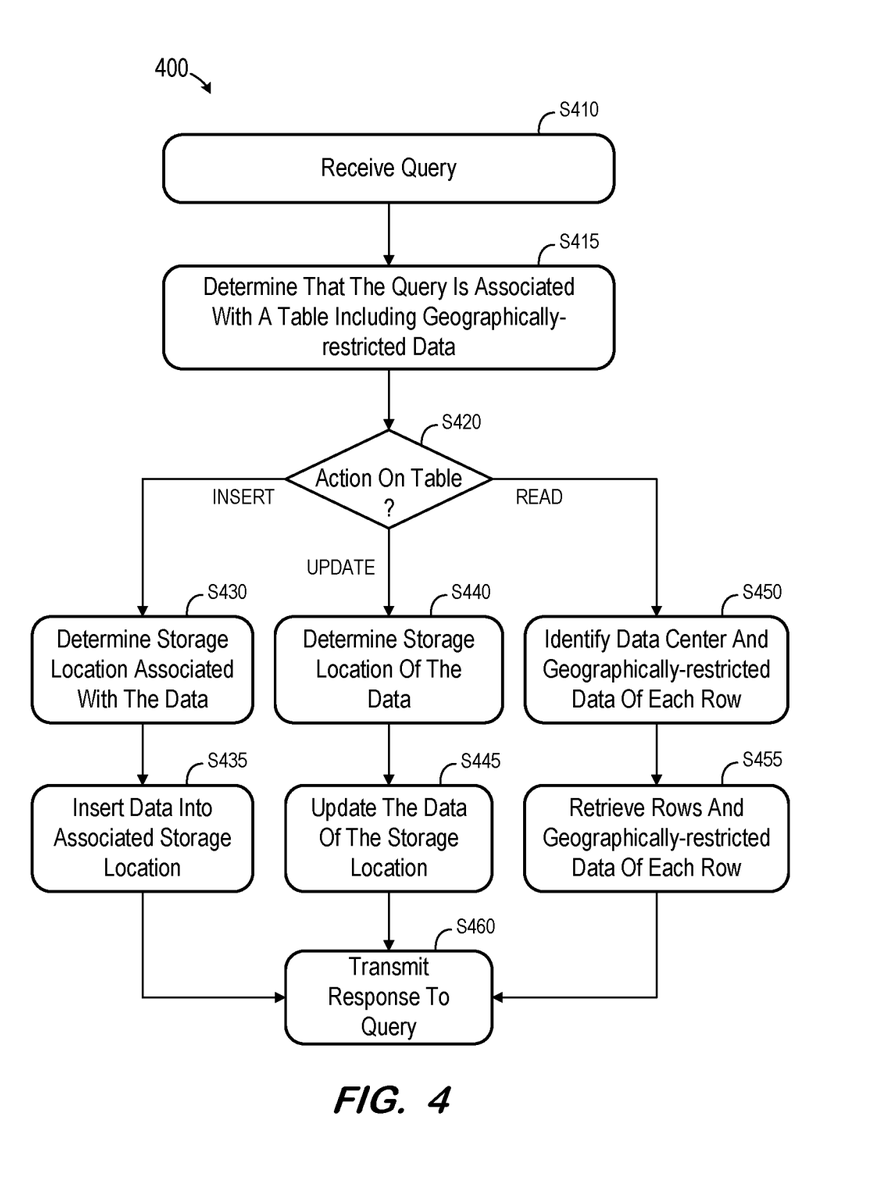
FIG. 4 comprises a flow diagram of a process according to some embodiments.

FIG. 4 comprises a flow diagram of process 400 which may be executed by server 120 according to some embodiments. A query is initially received at S410. The query may be received from an application 145 executing on a client and may specify an operation (e.g., INSERT, UPDATE, READ) to be performed on one or more database tables defined in the database catalog.

Next, at S415, it is determined that the query is associated with a table that includes geographically-restricted data. The determination may comprising identifying, based on the metadata of the database catalog, that a table specified in the query includes a partitioning column storing identifiers of geographic restrictions.

An action required by the query on the identified table is determined at S420. If, for example, the query requires insertion of data into the table, flow proceeds from S420 to S430. At S430, a storage location associated with the data to be inserted is determined. The storage location may be determined based on a value of a geographic identifier which is included in the data to be inserted. For UPDATE and READ, the application will typically provide a WHERE clause (or predicate, or filter) to identify which rows to update or read. For example, if the data to be inserted includes the value "U.S.A." in its partitioning column, the storage location determined at S430 is a storage location associated with the identifier "U.S.A."

In this regard, the database catalog may define database partitions. The geographically-separate portions of the database tables discussed herein may be considered as partitions of those database tables, with the partitions being associated with unique values of the partitioning column. The database catalog may therefore, for each table including geographically-restricted data, specify a storage location associated with each geographical restriction identifier of the table (e.g., Germany, U.S.A., etc.).

The data is inserted into the database table at the associated storage location at S435. In conventional range partitioning, a row is stored in its appropriate partition based on the row's primary key. In this regard, each partition is assigned to one or more ranges of primary key values. A primary key check is conducted to ensure that primary key values are unique. If the partitioning column is the primary key column, or one of the primary key columns, it is not necessary to check in other partitions for collisions—as rows that have collisions are local to the partition into which the row is being inserted as enforced by the partitioning function. In the present case, partitioning is not based on the primary key column(s), so some embodiments may check for primary key collisions prior to storage of each row into its associated storage location at S435. Flow then proceeds to S460 to transmit a response to the query (e.g., a confirmation message).

Flow proceeds to S440 if it is determined at S420 that the query requires an update to data of the table. A storage location associated with the data to be updated is determined at S440. For example, the query may specify a value of a geographic identifier associated with the rows to be updated, or the value may be specified in a WHERE clause of the query. The value is used to determine the storage location based on the database catalog as described above. The data stored at the determined storage location is then updated at S445, and a response to the query (e.g., a confirmation message) is transmitted at S460.

On the other hand, flow proceeds to S450 if it is determined at S420 that the query requires the reading of rows of the identified table. At S450, the data center(s) storing the rows to be read are identified based on the WHERE clause of the query. Also identified at S450 are the geographically-restricted data of each row. As will be described below, some columns of a row may be located in one storage location (e.g., without regard to geographic location) while other columns (e.g., including geographically-restricted data) may be located in a required geographic location. The rows to be read are retrieved from their one or more storage locations at S455, and the read values are transmitted in a response to the query at S460.

Figure 5:
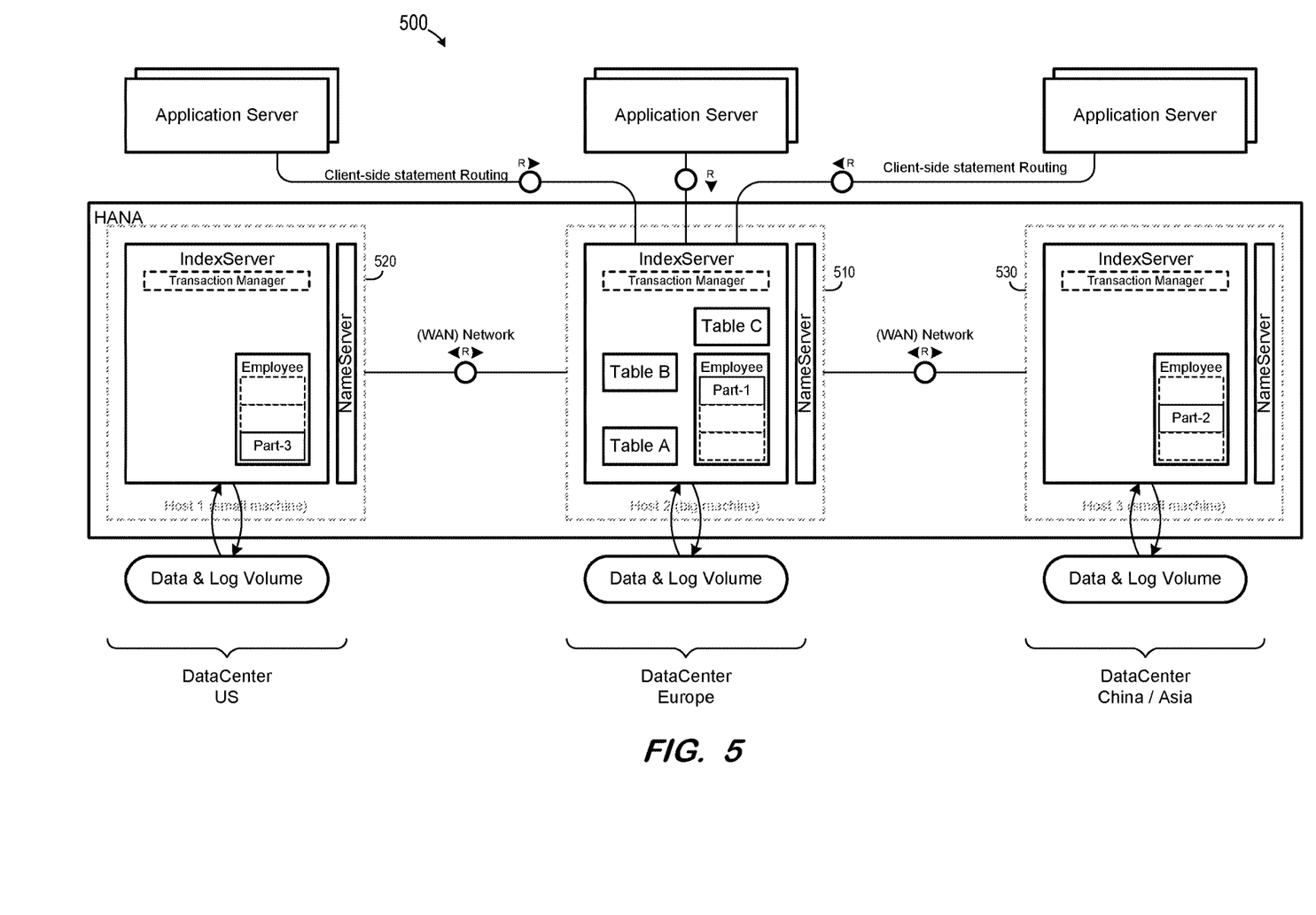
FIG. 5 is a block diagram of a runtime system architecture according to some embodiments.

FIG. 5 illustrates system 500 according to some embodiments. As shown, host 510, which may implement one of data stores 112 or 114, receives queries from all application servers of system 500. Host 510 may therefore execute process 400 as described above. Host 510 stores Table A, Table B, Table C and Partition 1 of an Employee table. In this regard, the data of Tables A, B and C are not geographically restricted but the Employee table is partitioned based on geographic restrictions as described herein. Since all queries are routed to host 510, it may be more efficient to store Tables A, B and C at host 510 to minimize a need to fetch remote data when serving the queries. Partitions 2 and 3 of the Employee table are only accessed by host 510 when needed to service a received query. According to some embodiments, hosts 520 and 530 may be configured to possess significantly less processing power than host 510, since most processing (JOINs, etc.) is performed on host 510.

Figure 6:
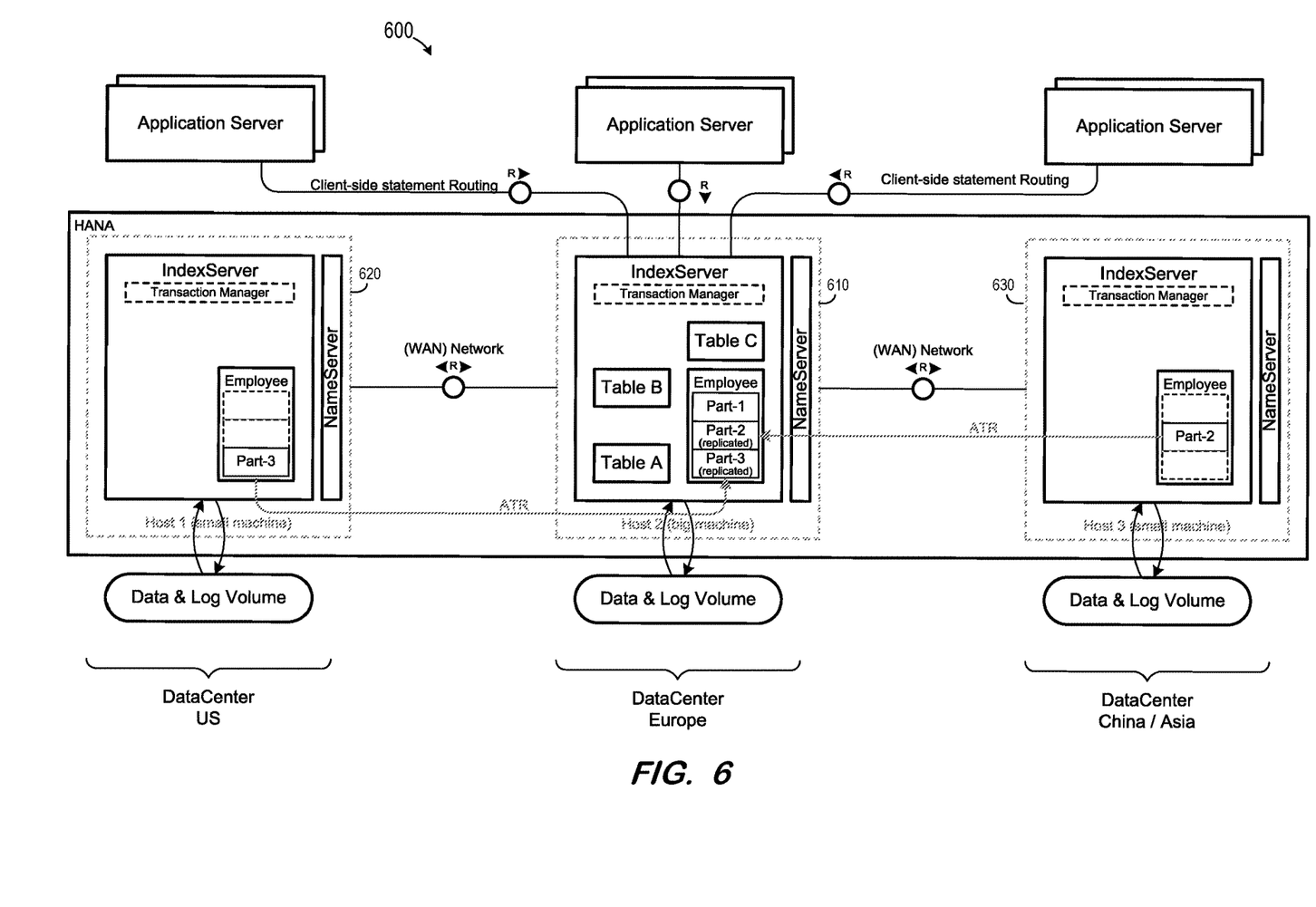
FIG. 6 is a block diagram of a runtime system architecture according to some embodiments.

System 600 of FIG. 6 is similar to system 500, but with portions of Partitions 2 and 3 of the Employee table being replicated in host 610. The replicated portions include columns of Partitions 2 and 3 which do not include geographically-restricted data. These local replicas can be used to more-efficiently service queries of the Employee table which do not require geographically-restricted data, without requiring remote calls to hosts 620 and 630.

For example, host 610 may aggregate locally on the replicated portions of the Employee table, for example, to count a number of rows which match specified criteria, as long as the criteria does not concern geographically-restricted data (i.e., which is stored in hosts 620 and 630). In another example, the replicated portions of the Employee table stored in host 610 may include an employee ID column of the Employee table, and therefore may be used to determine whether any employee is associated with a particular employee ID.

Figure 7:
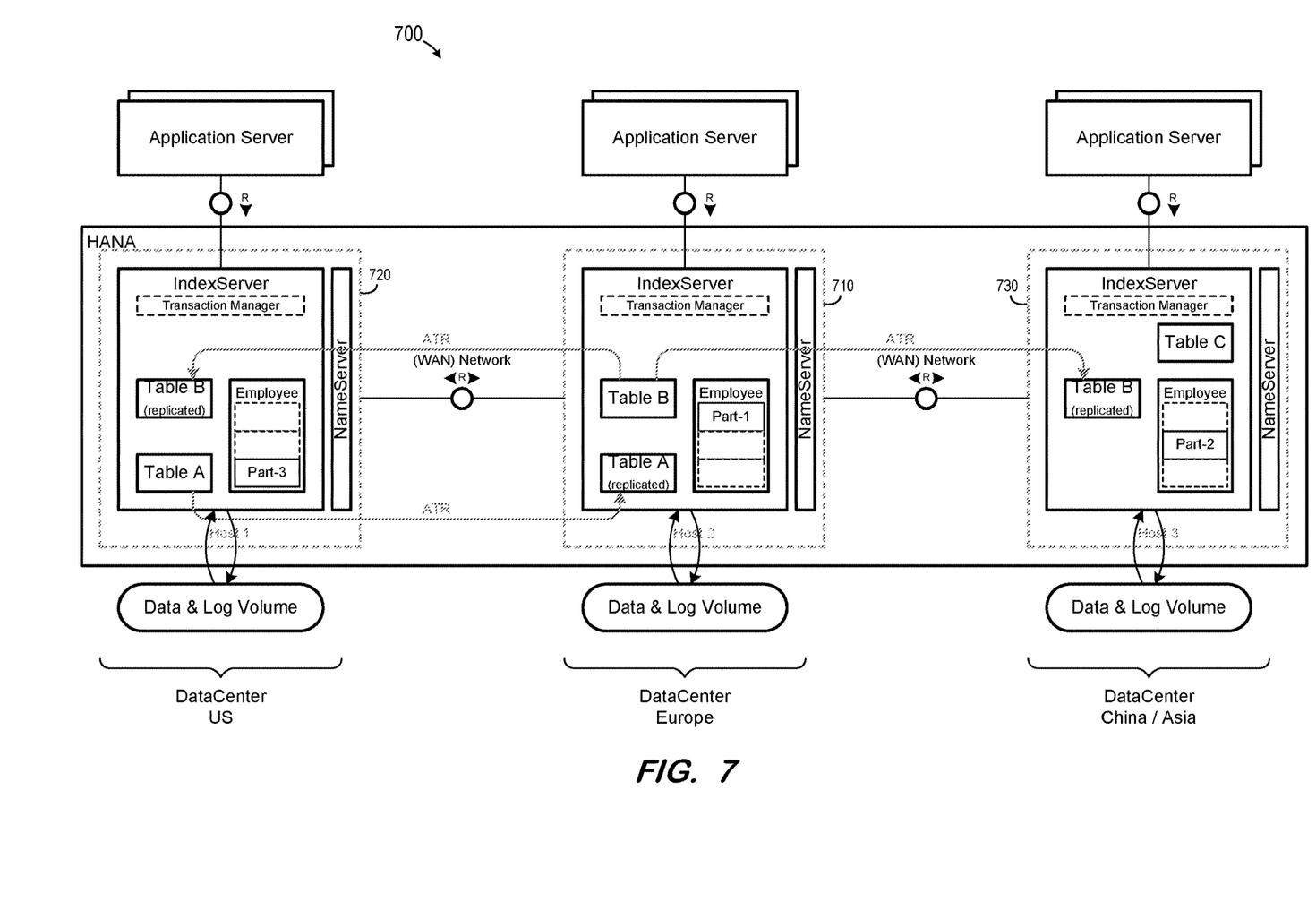
FIG. 7 is a block diagram of a runtime system architecture according to some embodiments.

FIG. 7 illustrates system 700 according to some embodiments. Each of hosts 710 through 720 may receive queries from their associated application servers. Tables A, B and C are located and selectively replicated in hosts 710 through 730 based on their expected usage as is known in the art. Again, each of hosts 710 through 730 stores a partition of the Employee table which includes data restricted to the geographic location of the host.

Figure 8:
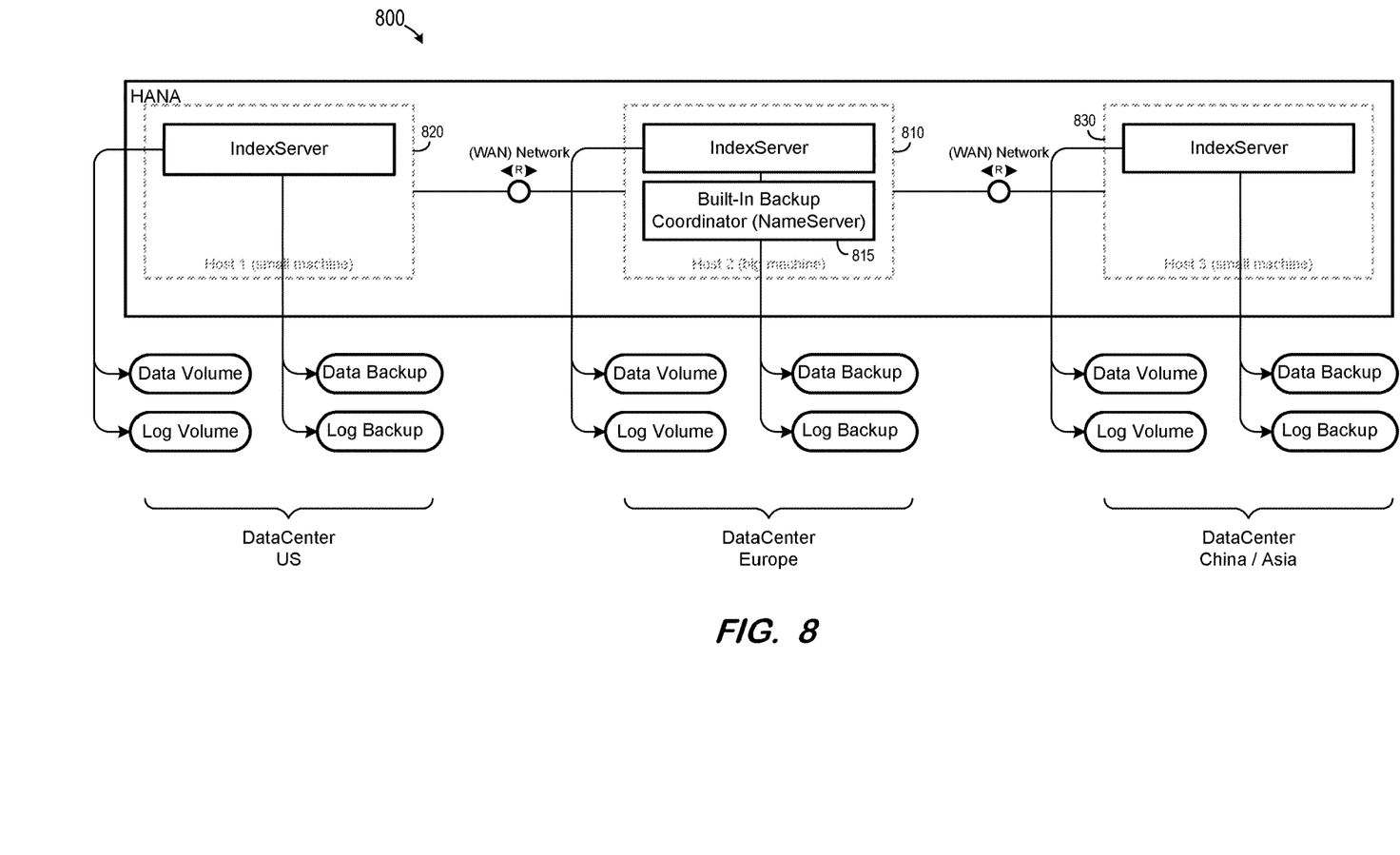
FIG. 8 is a block diagram of a backup system architecture according to some embodiments.

Geographic restrictions also may be considered during backup and restore operations. Specifically, it is desirable to maintain geographic data restrictions with respect to data stored within log backups and data backups. FIG. 8 illustrates backup architecture 800 according to some embodiments. As shown, each host 810 through 830 maintains its own local data and log volumes and data and log backups. The files of each volume and backup are written directly by their corresponding host's IndexServer.

Architecture 800 also supports a shared file system using backup coordinator 815 of host 810. Location-specific rules (e.g., General Parallel File System rules) are set to allow the file system to manage data locations. The file names are adapted to conform to a pattern that can be used for applying the file system rules. Some of such embodiments facilitate checking that all files exist before initiating recovery from a backup. During recovery, each process may pick up and restore any volume at any moment. Accordingly, a fixed mapping of filenames to data locations is desirable.

Figure 9:
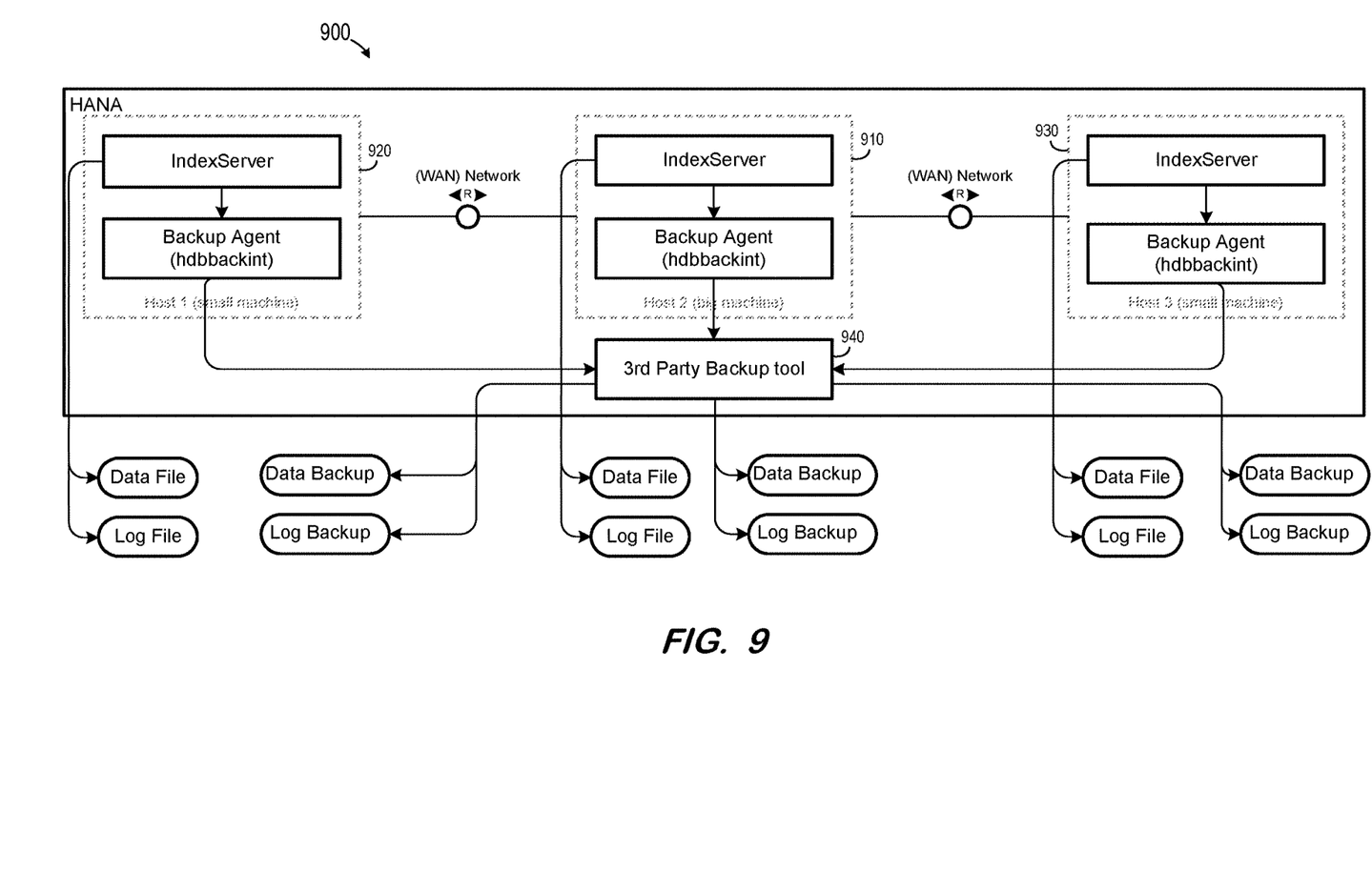
FIG. 9 is a block diagram of a backup system architecture according to some embodiments.

According to backup architecture 900 of FIG. 9, third-party backup tool 940 triggers the backup. Each IndexServer of hosts 910 through 930 sends its data to its host-local backup agent, which then delivers the data to third-party backup tool 940. Backup tool 940 either supports remote access to the individual backup volumes in remote data centers, or uses file names conforming to a pattern as described above which allows the application of shared file system rules to pin files to particular data storage locations.

Figure 10:
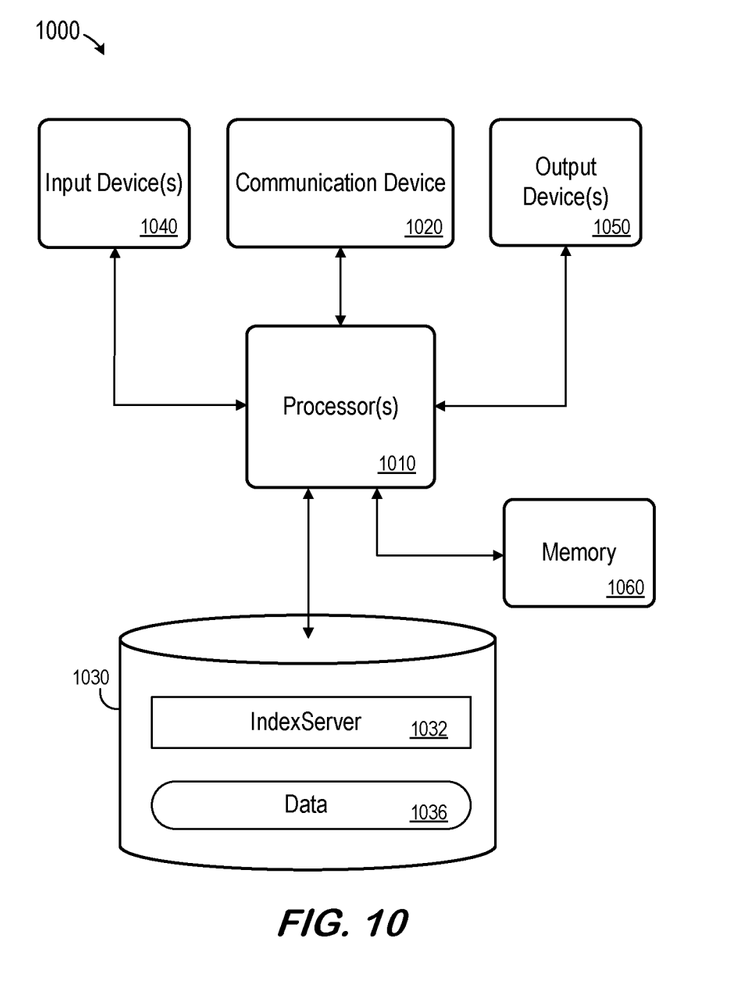
FIG. 10 is a block diagram of a computing system according to some embodiments.

FIG. 10 is a block diagram of apparatus 1000 according to some embodiments. Apparatus 1000 may comprise a general-purpose computing apparatus and may execute program code to perform any of the functions described herein. Apparatus 1000 may comprise an implementation of server 120 and data store 112 of FIG. 1 and/or of hosts 510, 610 or 710 in some embodiments. Apparatus 1000 may include other unshown elements according to some embodiments.

Apparatus 1000 includes processor(s) 1010 operatively coupled to communication device 1020, data storage device 1030, one or more input devices 1040, one or more output devices 1050 and memory 1060. Communication device 1020 may facilitate communication with external devices, such as an administration device and/or a remote data store. Input device(s) 1040 may comprise, for example, a keyboard, a keypad, a mouse or other pointing device, a microphone, knob or a switch, an infra-red (IR) port, a docking station, and/or a touch screen. Input device(s) 1040 may be used, for example, to enter information into apparatus 1000. Output device(s) 1050 may comprise, for example, a display (e.g., a display screen) a speaker, and/or a printer.

Data storage device 1030 may comprise any appropriate persistent storage device, including combinations of magnetic storage devices (e.g., magnetic tape, hard disk drives and flash memory), optical storage devices, Read Only Memory (ROM) devices, etc., while memory 1060 may comprise Random Access Memory (RAM), Storage Class Memory (SCM) or any other fast-access memory. Memory 1060 may include local buffers operating as described herein.

IndexServer 1032 may comprise program code executed by processor(s) 1010 to cause apparatus 1000 to perform any one or more of the processes described herein. Embodiments are not limited to execution of these processes by a single apparatus. Data 1036 may include database tables, including geographically-restricted partitions as described herein. Data 1036 (either cached or a full database) may also be stored in volatile memory such as memory 1060. Data storage device 1030 may also store data and other program code for providing additional functionality and/or which are necessary for operation of apparatus 1000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
 a first computing device comprising:
  a first memory storing first processor-executable process steps and one or more logical database tables, each database table having one or more columns; and
  a first of at least one processor to execute the first processor-executable process steps to cause the first computing device to:
   receive a first query;
   determine that the first query is associated with a first table including geographically-restricted data based on the first table including a partitioning column storing geographic identifiers of geographic locations in which the geographically-restricted data of the first table is to be stored, the geographically-restricted data restricted to being stored in a specific geographic location;
   determine, based on the partitioning column of the first table and on the first query, (i) first partition of the first table, the first partition being associated with a first geographic identifier of the geographic identifiers stored in the partitioning column of the first table, (ii) a first remote storage location of a first portion of the first partition storing geographically-restricted data restricted to the geographic location specified by the first geographic identifier, and (iii) a first local storage location of a second replicated portion of the first partition storing a subset of data from the first partition other than the geographically-restricted data restricted to the geographic location specified by the first geographic identifier, the first local storage location being located in a geographic location different from the geographic location specified by the first geographic identifier; and
   execute the first query in conjunction with the first remote storage location of the first portion of the first partition and the first local storage location of the second replicated portion of the first partition.

2. A system according to claim 1, the first at least one processor to further execute the first processor-executable process steps to cause the first computing device to:
 receive a third query;
 determine that the third query is associated with a second table, the second table not including geographically-restricted data or a partitioning column storing identifiers of geographic restrictions;
 determine a local storage location of the second table; and
 execute the third query in conjunction with the local storage location of the second table.

3. A system according to claim 2, the first at least one processor to further execute the first processor-executable process steps to cause the first computing device to:
 perform a backup operation to create a local backup of the second replicated portion of the first partition of the first table, and the second table.

4. A system according to claim 2, further comprising:
 a second computing device comprising:
  a second memory storing second processor-executable process steps; and
  a second at least one processor to execute the second processor-executable process steps to cause the second computing device to:
 store the second partition of the second table.

5. A system according to claim 4, the first at least one processor to further execute the first processor-executable process steps to cause the first computing device to:
 perform a backup operation to create a local backup of the second replicated portion of the first partition of the first table, and
 the second at least one processor to further execute the second processor-executable process steps to cause the second computing device to:
 perform a backup operation to create a local backup of the second partition of the second table.

6. A system according to claim 5, wherein the first computing device and the second computing device are located in different legal jurisdictions.

7. A system according to claim 1, the first at least one processor to further execute the first processor-executable process steps to cause the first computing device to:
 perform a backup operation to create a local backup of the second replicated portion of the first partition of the first table.

8. A computer-implemented method, implemented in a first host comprising a processor and a memory storing one or more logical database tables, each database table having one or more columns, the method comprising:
 receiving a first query at the first host;
 determining, at the first host, that the first query is associated with a first table including geographically-restricted data based on the first table including a partitioning column storing geographic in which the geographically-restricted data of the first table is to be stored, the geographically-restricted data restricted to being stored in a specific geographic location identifiers of geographic locations;
 determining, at the first host and based on the partitioning column of the first table and on the first query, (i) first partition of the first table, the first partition being associated with a first geographic identifier of the geographic identifiers stored in the partitioning column of the first table, (ii) a first remote storage location of a first portion of the first partition storing geographically-restricted data restricted to the geographic location specified by the first geographic identifier, and (iii) a first local storage location of a second replicated portion of the first partition storing a subset of data from the first partition other than the geographically-restricted data restricted to the geographic location specified by the first geographic identifier, the first local storage location being located in a geographic location different from the geographic location specified by the first geographic identifier; and executing the first query at the first host in conjunction with the first remote storage location of the first portion of the first partition and the first local storage location of the second replicated portion of the first partition.

9. A method according to claim 8, further comprising:
receiving a third query at the first host;
determining, at the first host, that the third query is associated with a second table, the second table not including geographically-restricted data or a partitioning column storing identifiers of geographic restrictions;
determining, at the first host, a local storage location of the second table; and
executing the third query at the first host in conjunction with the local storage location of the second table.

10. A method according to claim 9, further comprising:
performing a backup operation at the first host to create a local backup of the second replicated portion of the first partition of the first table, and the second table.

11. A method according to claim 9, further comprising:
storing the second partition of the second table at a second host.

12. A method according to claim 11, further comprising:
performing a backup operation at the first host to create a local backup of the second replicated portion of the first partition of the first table; and
performing a backup operation at the second host to create a local backup of the second partition of the second table.

13. A method according to claim 12, wherein the first host and the second host are located in different legal jurisdictions.

14. A method according to claim 8, further comprising:
performing a backup operation at the first host to create a local backup of the second replicated portion of the first partition of the first table.

15. A system implemented by one or more computing devices, the system to:
receive a first query at a first host;
determine, at the first host, that the first query is associated with a first database table including geographically-restricted data based on the first table including a partitioning column storing geographic identifiers of geographic locations in which the geographically-restricted data of the first table is to be stored, the geographically-restricted data restricted to being stored in a specific geographic location;
determine, at the first host and based on the partitioning column of the first table and on the first query, (i) first partition of the first table, the first partition being associated with a first geographic identifier of the geographic identifiers stored in the partitioning column of the first table, (ii) a first remote storage location of a first portion of the first partition storing geographically-restricted data restricted to the geographic location specified by the first geographic identifier, and (iii) a first local storage location of a second replicated portion of the first partition storing a subset of data from the first partition other than the geographically-restricted data restricted to the geographic location specified by the first geographic identifier, the first local storage location being located in a geographic location different from the geographic location specified by the first geographic identifier; and
execute the first query at the first host in conjunction with the first remote storage location of the first portion of the first partition and the first local storage location of the second replicated portion of the first partition.

16. A system according to claim 15, further to:
receive a third query at the first host;
determine, at the first hos, that the third query is associated with a second table, the second table not including geographically-restricted data or a partitioning column storing identifiers of geographic restrictions;
determine, at the first host, a local storage location of the second table; and
execute the third query at the first host in conjunction with the local storage location of the second table.

17. A system according to claim 16, further to:
perform a backup operation at the first host to create a local backup of the second replicated portion of the first partition of the first table, and the second table.

18. A system according to claim 16, further to:
store the second partition of the second table at a second host;
perform a backup operation at the first host to create a local backup of the second replicated portion of the first partition of the first table; and
perform a backup operation at the second host to create a local backup of the second partition of the second table.

19. A system according to claim 18, wherein the first host and the second host are located in different legal jurisdictions.

20. A system according to claim 15, further to:
perform a backup operation at the first host to create a local backup of the second replicated portion of the first partition of the first table.

* * * * *